United States Patent
Caratelli

(10) Patent No.: US 11,933,222 B2
(45) Date of Patent: Mar. 19, 2024

(54) AERODERIVATIVE GAS TURBINE WITH IMPROVED THERMAL MANAGEMENT

(71) Applicant: Nuovo Pignone Tecnologie Srl, Florence (IT)

(72) Inventor: Francesco Caratelli, Florence (IT)

(73) Assignee: Dresser, LLC, Houston, TX (US)

( * ) Notice: Subject to any disclaimer, the term of this patent is extended or adjusted under 35 U.S.C. 154(b) by 0 days.

(21) Appl. No.: 16/267,972

(22) Filed: Feb. 5, 2019

(65) Prior Publication Data

US 2019/0264613 A1 Aug. 29, 2019

(30) Foreign Application Priority Data

Feb. 28, 2018 (IT) .................. 102018000003136

(51) Int. Cl.
| | | |
|---|---|---|
| *F02C 7/18* | (2006.01) | |
| *F01D 25/14* | (2006.01) | |
| *F01D 25/26* | (2006.01) | |
| *F02C 7/20* | (2006.01) | |
| *F02C 7/24* | (2006.01) | |
| *F02K 3/065* | (2006.01) | |

(52) U.S. Cl.
CPC .............. *F02C 7/20* (2013.01); *F01D 25/145* (2013.01); *F01D 25/26* (2013.01); *F02C 7/18* (2013.01); *F02C 7/24* (2013.01); *F02K 3/065* (2013.01); *F05D 2210/40* (2013.01); *F05D 2260/221* (2013.01); *F05D 2260/231* (2013.01); *F05D 2270/3032* (2013.01); *F05D 2300/614* (2013.01)

(58) Field of Classification Search
CPC ........ F01D 25/145; F01D 11/00; F01D 11/08; F01D 11/14; F01D 11/16; F01D 11/18; F01D 11/20; F01D 11/24; F01D 25/26; F02C 7/18; F02C 7/24; F02K 3/065
See application file for complete search history.

(56) References Cited

U.S. PATENT DOCUMENTS 5,662,457 A 9/1997 Bechtel et al.
7,584,618 B2 * 9/2009 Amiot ................ F01D 11/24
  60/782

(Continued)

FOREIGN PATENT DOCUMENTS

EP 2826959 A2 1/2015
FR 2957115 A1 9/2011

(Continued)

OTHER PUBLICATIONS

Italian Search Report and Written Opinion issued in connection with corresponding IT Application No. 102018000003136 dated Oct. 24, 2018.

*Primary Examiner* — Christopher Verdier
*Assistant Examiner* — Michael K. Reitz
(74) *Attorney, Agent, or Firm* — Paul Frank + Collins P.C.

(57) ABSTRACT

An aeroderivative gas turbine provided with a casing, a compressor including a rotor mounted on a generator shaft supported for rotation in the casing, a high pressure turbine arranged in the casing and with a rotor mounted on the generator shaft for co-rotation with the compressor rotor, a combustor, a power turbine arranged in the casing and including a rotor mounted on a turbine shaft to drive a load, wherein a thermal insulation coating is present to reduce heat dispersion through the casing.

9 Claims, 5 Drawing Sheets

(56) References Cited

U.S. PATENT DOCUMENTS

| | | | |
|---|---|---|---|
| 8,403,637 B2 * | 3/2013 | Kirby | F01D 11/24 |
| | | | 415/176 |
| 8,459,159 B2 * | 6/2013 | Jessen | B26F 1/02 |
| | | | 83/123 |
| 2010/0139288 A1 * | 6/2010 | Rago | F02C 7/185 |
| | | | 415/116 |
| 2013/0051995 A1 | 2/2013 | Wiebe | |
| 2014/0234073 A1 * | 8/2014 | Moreton | F02C 7/18 |
| | | | 415/1 |
| 2015/0030434 A1 | 1/2015 | Stanka et al. | |
| 2016/0251981 A1 | 9/2016 | Hashimoto | |
| 2017/0198604 A1 * | 7/2017 | Lefebvre | F01D 25/30 |

FOREIGN PATENT DOCUMENTS

| | | |
|---|---|---|
| WO | 2013072291 A1 | 5/2013 |
| WO | 2013131968 A1 | 9/2013 |

\* cited by examiner

AERODERIVATIVE GAS TURBINE WITH IMPROVED THERMAL MANAGEMENT

BACKGROUND OF THE INVENTION

The present disclosure relates generally to gas turbines, particularly, to aeroderivative gas turbines.

Aeroderivative gas turbines are widely used as power sources for mechanical drive applications, as well as in power generation for industrial plants, pipelines, offshore platforms, LNG applications and the like.

In these turbo-machines non-uniform thermal deformations may occur with the reduction or elimination of clearances between rotor and stator parts, hence leading to a rubbing between rotor and stator parts or a rising up to rotor locking phenomena. These turbines are, in fact, characterized by a minimal weight of the casing from the flight engine coupled with a robust rotor design to handle high over-speed events as per industrial applications and, thus, by parts having different thermal capacity.

In WO2013/131968 the problem of rotor locking upon shut down is solved by using a force-air stream to remove the heat from the turbomachinery in locking state such as to neutralize the effect of thermal differential expansion thus allowing the turbine to be restarted in a shorter time.

In WO2013/072291 differential thermal expansion is controlled by keeping the rotor slowly moving after shut off.

Although serving the scope, these solutions are rather complex and can be applied only when the turbine is shut off.

It is thus an object of the present disclosure to design a turbomachinery with an improved thermal control mitigating risk of rotor lock also in running condition.

SUMMARY OF THE INVENTION

According to the exemplary embodiments disclosed herein, there is an aeroderivative gas turbine provided with a structure allowing an optimized thermal control to avoid rotor locking, a common phenomenon among aeroderivative gas turbines. Rotor locking is due to the fact that aeroderivative gas turbines have a casing of minimal weight coupled with a robust rotor, designed to handle high over-speed events as in many industrial applications.

Instead of increasing heat exchange to reduce temperature gradients in the turbine responsible of rotor locking, embodiments disclosed herein provide for preventing heat from leaving the casing of the turbine. This allows compensating for temperature gradients also when the turbine is in operation.

For achieving thermal control of the turbine, in an embodiment the insulation coating is an insulation assembly comprising an insulating sheet or panel coupled to a metal sheet maintained at a designed distance from the casing to create passage for cooling air between the casing and the panel. This allows to circulate air between the casing and the insulation coating to keep temperature under safe limits.

In further embodiments the turbine is part of a system that comprises one or more sensors to measure the speed of the rotor and/or the temperature in one or more areas of the aeroderivative turbine and a control unit configured to read the output of one or more sensors. The output of said one or more sensors is compared to predefined thresholds to determine an ongoing condition of over-temperature and act on the forced-air generator to regulate air flow in the passage to control heat exchange through the casing. Said thresholds can be temperature target of variable value depending from the aeroderivative turbine running state.

With this more sophisticated solution full thermal control of the turbine can be achieved.

BRIEF DESCRIPTION OF THE DRAWINGS

The present disclosure will become more apparent from the following description of exemplary embodiments to be considered in conjunction with accompanying drawings wherein.

The following detailed description of exemplary embodiments refer to the accompanying drawings. The same reference numbers in different drawings identify the same or similar elements. The following detailed description does not limit embodiments of the invention. Instead, the scope of embodiments of the invention is defined by the appended claims.

DETAILED DESCRIPTION

The exemplary embodiments set forth below refer to an aeroderivative gas turbine wherein the thin case is thermally insulated by means of a panel. This panel is maintained at a designed distance from the case thus building a cooling air flow passage. Cooling air is driven to the passage through air inlet manifolds. The position of the inlet manifolds, the cooling air quantity and the number and geometry of the spacers employed to keep the panel distant from the case are optimized to meet case metal temperature requirement. Air can be supplied by the gas turbine axial compressor extraction or by external sources. Air is shut-off at gas turbine shut-off. The embodiments herein allow to design the required thermal response both in running condition and after shut-off thus mitigating the risk for rotor lock and/or the risk of damaging of the turbine parts.

Figure 1:
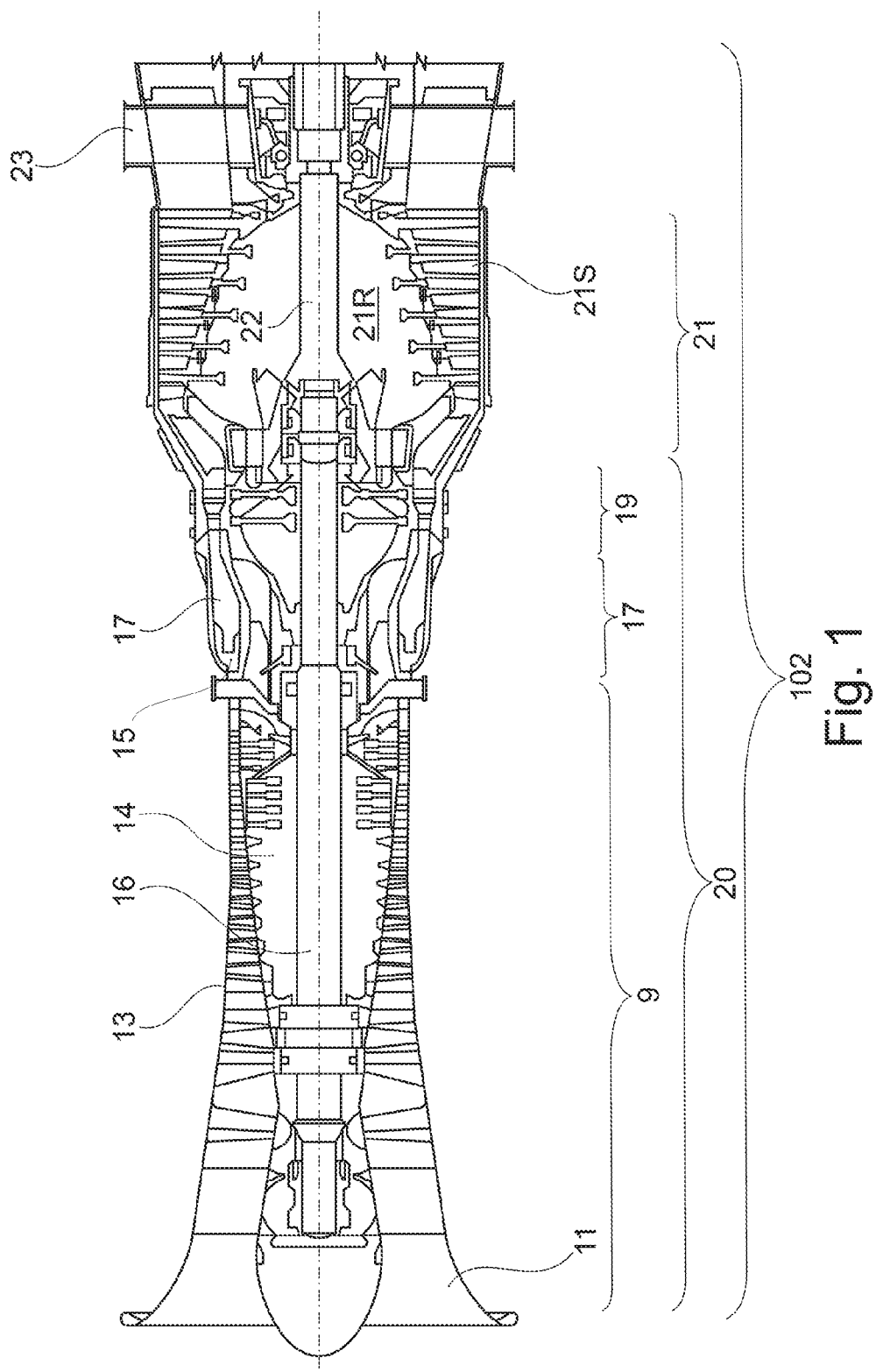
FIG. 1 illustrates a schematic longitudinal section of an exemplary embodiment of an aeroderivative gas turbine.

In the embodiment shown in FIG. 1, an aeroderivative gas turbine 102 comprises a compressor section 9, including a compressor front frame or bell mouth 11, forming a compressor air-intake, a casing 13 and a rotor 14 supported in a rotating manner by a shaft 16 and arranged in the casing 13. Rotary blades on the rotor 14 and stationary blades on the casing 13 cause air to be sucked through the bell mouth 11, compressed and fed to an outlet 15 of the compressor section 9. Outlet 15 is in fluid communication with a combustor 17. Compressed air exiting the compressor section 9 is fed into combustor 17, together with a gaseous or liquid fuel.

Combustor 17 is in fluid communication with a high pressure turbine 19. The high pressure turbine 19 is driven into rotation by the combustion gases flowing there through and provides power to drive the compressor section 9. Only part of the power available is used by the high pressure turbine 19 to drive the compressor. Hot gases exiting the high pressure turbine 19 are still pressurized and will be used in a downstream section of the aeroderivative gas turbine to generate mechanical power. The combination of compressor section 9, combustor 17 and high pressure turbine 19 is usually named gas generator and is designated 20 as a whole in the drawings.

In the embodiment illustrated in the drawings, the rotor 14 of the compressor section 9 and the rotor of the high pressure turbine 19 are supported by a common shaft 16 and jointly form a gas generator rotor. The gas generated by the gas generator 20 and exiting the high pressure turbine 19 flows through a power turbine section downstream, wherein the energy contained in the gas is partly transformed into mechanical energy.

In the exemplary embodiment shown in the drawings, the power turbine section comprises a low pressure power turbine 21, which comprises a stator 21S and a rotor 21R. In the embodiment illustrated in the drawings, rotor 21R of the power turbine 21 is supported on and torsionally connected to a turbine shaft 22, which is mechanically separated from shaft 16 of the gas generator. The shaft 22 is provided to drive a generic load, for example an electric generator, a compressor or a compressor train of a natural gas liquefaction line, or any other suitable load.

The power turbine 21 can include a variable number of expansion stages. The exemplary embodiment illustrated in FIG. 1 includes a low speed, six-stages power turbine. Other embodiments can include a high-speed power turbine, e.g. a highspeed, two-stages power turbine. Exhaust gases exiting the power turbine in 23 can be used for co-generation purposes, or simply discharged into the atmosphere.

The aeroderivative gas turbine illustrated in FIG. 1 is only an example. Various and different commercially available aeroderivative gas turbines can be used in this application. The overall structure and layout, including the number of compressors, the number of turbines, the number of shafts and the number of compression and expansion stages, may vary from one aeroderivative gas turbine to another. Suitable aeroderivative gas turbines are LM2500 Plus G4 HSPT or LM2500 Plus 6-Stage gas turbines: Both are commercially available from GE Aviation; Evendale, Ohio; USA. Other suitable aeroderivative gas turbines are the PGT25+ aeroderivative gas turbine; commercially available from BHGE; Florence, Italy; or the Dresser-Rand Vectra® 40G4 aeroderivative gas turbine, commercially available from Dresser-Rand Company; Houston, Texas; USA. In other embodiments, the aeroderivative gas turbine could be a PGT 16, a PGT 20, or a PGT 25; all commercially available from BHGE; Florence, Italy. Also suitable is an LM6000 aeroderivative gas turbine; commercially available from GE Aviation; Evendale, Ohio; USA or LM9000; commercially available from BHGE; Florence; Italy. In some embodiments, the shaft of the aeroderivative gas turbine can drive a load directly, i.e. with a direct mechanical connection, so that the load rotates at substantially the same speed as the power turbine of the aeroderivative gas turbine 102. In other embodiments, a gearbox can be arranged between the shaft of the power turbine and the shaft of the load. The particular arrangement depends on design considerations, based on the kind of power turbine used (high speed or low speed) and/or on the rotary speed of load.

Whatever is the type of turbine used, according to embodiments herein, the casing is at least partially thermally insulated to reduce the gradient of temperature between the casing and the rotor to avoid rotor locking.

Figure 2:
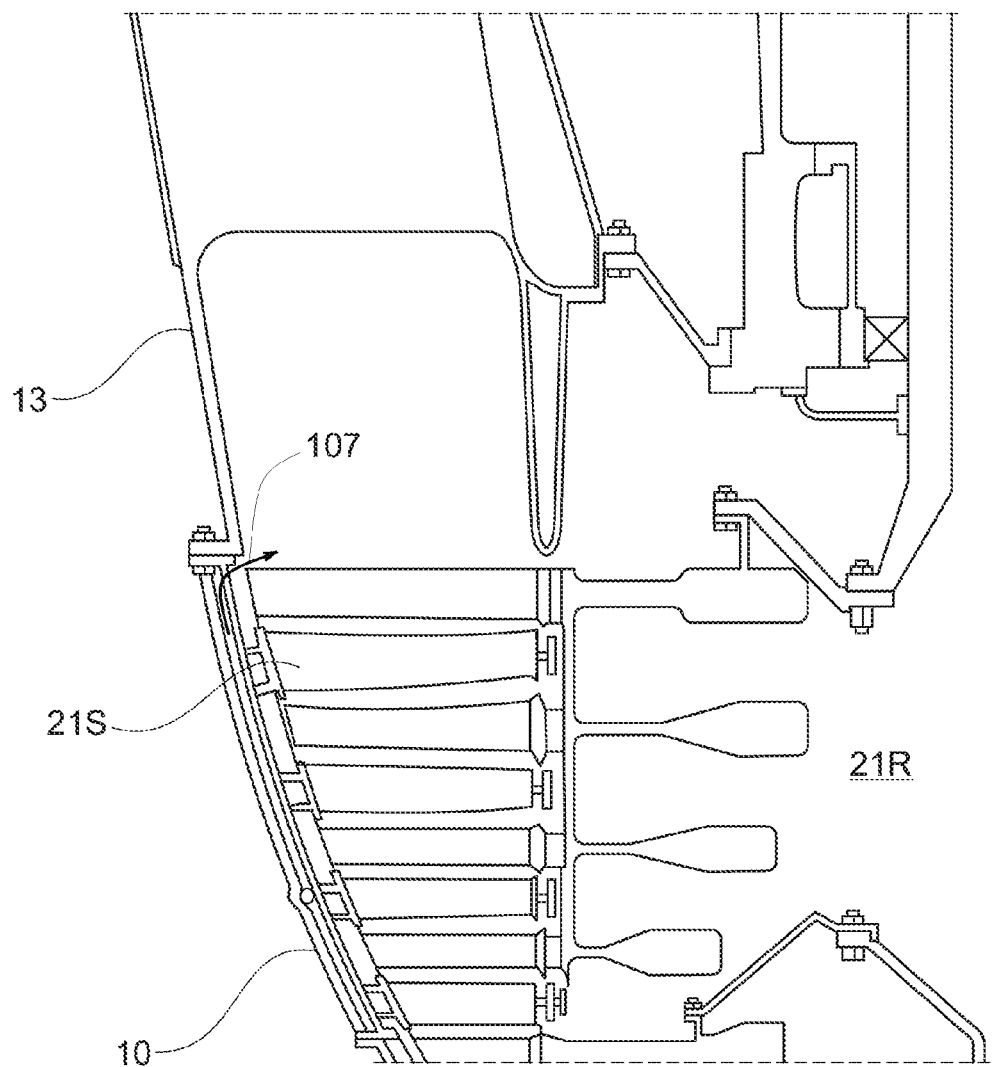
FIG. 2 illustrates a sheet or panel partially insulating the casing of an aeroderivative gas turbine according to embodiments herein.

According to the embodiment exemplary shown in FIG. 2, such thermal insulation is obtained by applying a panel 10 to the casing 13 in correspondence of the low pressure turbine 21 of FIG. 1. This is clearly a non-limiting example as the panel can be positioned indistinguishably in correspondence of the high pressure turbine 19 or the compressor section 9 or in any combination thereof.

It is also possible to provide an insulating panel or layer 10 only on part or parts of the aeroderivative turbine sections to optimize the thermal response of the same.

Figure 3:
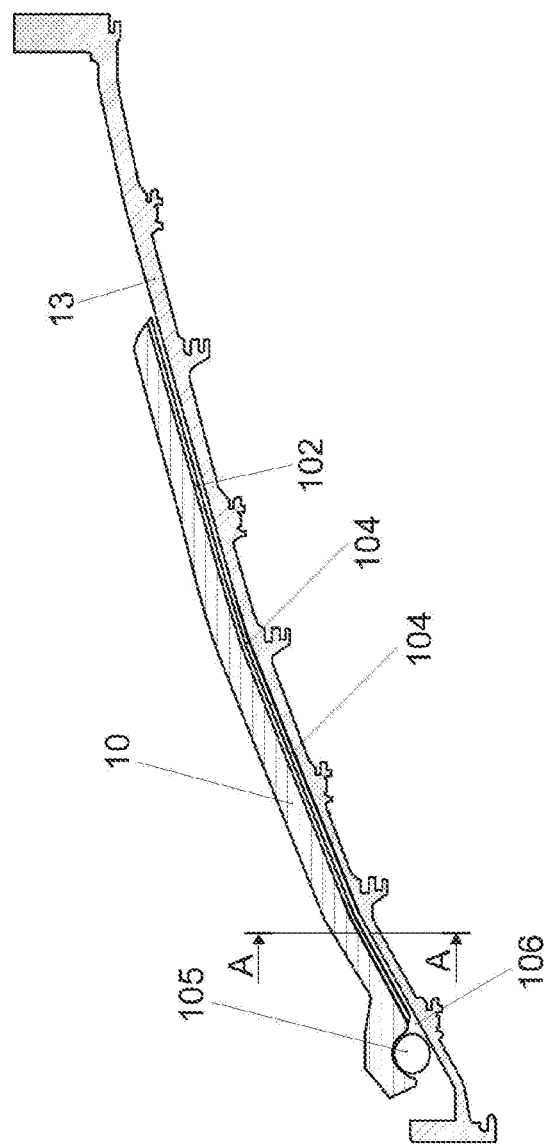
FIG. 3 illustrates schematically the thermal profile of the casing provided with an insulation layer.

FIG. 3 shows, in grey level shadings, the thermal behavior of a section of the case 13 of a turbine when a thermal insulation assembly 10 is applied.

Figure 4:
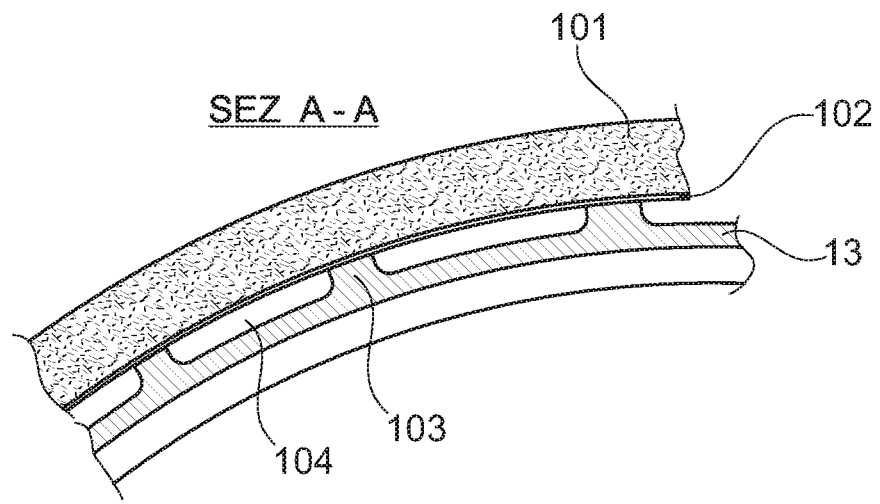
FIG. 4, FIG. 5 and FIG. 6 illustrate cross sectional views along the section line A-A of FIG. 3 showing the thermal insulation layer in different configurations.

In one embodiment exemplary shown in FIG. 4, such an insulation assembly 10 comprises a panel 101 coupled to a metal sheet 102 maintained at a designed distance from the casing 13 by milling longitudinal ribs 103 on the casing. This allows to create a passage 104 for cooling air.

Figure 5:
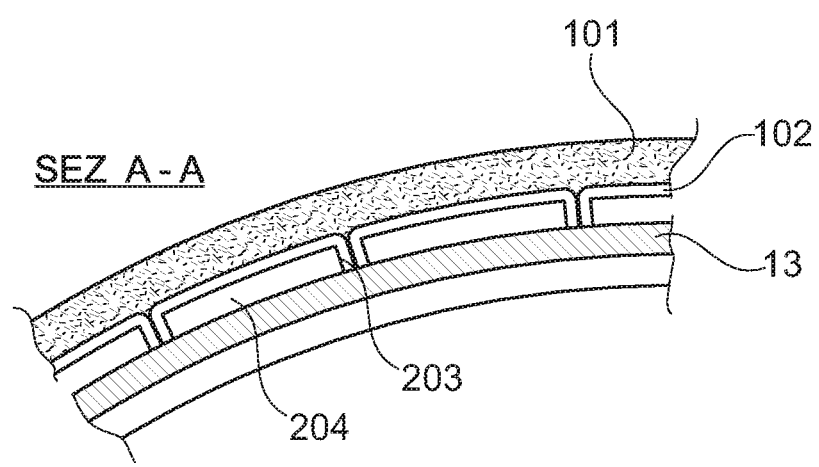

In the embodiment of FIG. 5, ribs or protuberances 203 of the metal sheet 102 define air passage 204 between the casing 13 and the panel 101. Such ribs can be obtained, for example, by bending the sheet at certain points to create pins or pillars 203.

Figure 6:
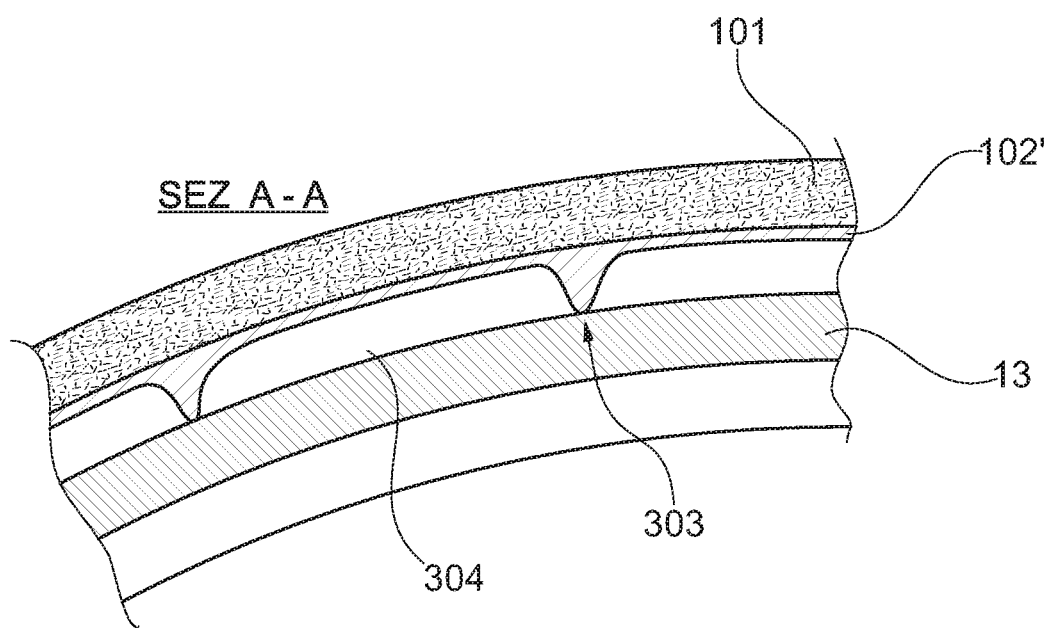

In the embodiment of FIG. 6, the metal sheet is substituted by an external casing 102' welded on the main casing 13 of the turbine, for example by a brazing process. Welding points define spacers 303 allowing to create a passage 304 for cooling air as in previous embodiments.

Combinations of these solutions are obviously possible. The external casing 102' can, for example, be coupled to a metal sheet 102 to improve thermal conductivity of the insulation assembly 10. Metal sheet 102 or external casing 102' could also be omitted in some embodiments.

The panel 101 can be of any geometrical shape and can be applied longitudinally, circumferentially, spirally or following any suitable pattern to provide an optimized thermal management.

As far as the material is concerned, the insulating panels 101 can be quilted panels encased in woven glass cloth and stitched through parallel or crosswise in distances from 25 to 100 mm in order to give flexibility in one or two dimensions. Thread types can include glass, aramid or stainless steel. The density of quilted panels is typically in the range 190 to 300 Kg/m$^3$. The glass cloth is provided for handling purposes only and embrittles or melts at temperature below the maximum usage temperature of the insulation without affecting the insulation properties in service.

Cooling air is impinged in the passage 104, 204, 304 through air inlet 106 by means of air manifolds 105 as best seen in FIG. 3. Position and quantity of the inlet manifolds 105, air quantity and geometry of the spacer are optimized to meet case metal temperature requirement.

Air is supplied by gas turbine axial compressor extraction or by external sources and, more in general, by a forced air-stream generator in fluid communication with an air intake plenum. The forced-air generator generates a stream of forced cooling air at a pressure sufficient to circulate the cooling air in the air passage to control heat dissipation. Air is shut-off at gas turbine shut-off. Outlets 107 are provided in the passage 104, 204, 304 to allow air to exit either in the external environment or in the turbine main outlet 23 to avoid heating the room containing the turbine.

In an embodiment the turbine comprises one or more sensors to measure the speed of the rotor and/or the temperature in one or more areas of the aeroderivative turbine and a control unit configured to:
read the output of the sensor or the sensors;
compare the output with thresholds to determine a condition of over-temperature;
act on the forced-air generator to regulate air flow in the passage 104, 204, 304 to control heat exchange through the casing.

The system allows to design the required thermal response both in running condition and after shut-off. The passage 104, 204, 304, allows the air therein to act as a thermal insulator for the turbine rotor after shut-off thus avoiding the rotor to lower its temperature too much and too quickly and possibly undergo damages. Therefore, the thermal response of the case would be made convenient with respect the thermal response of the rotor in all of the mission steps, so to drive the best clearances mitigating the risk for rotor lock and/or the risk of damaging of the parts.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An aeroderivative gas turbine comprising: a casing having adjacent channels separated by ribs; a compressor having a rotor mounted on a generator shaft supported for rotation in the casing; a combustor; a high pressure turbine arranged in the casing and comprised of a rotor mounted on the generator shaft for co-rotation with the compressor rotor; a power turbine arranged in the casing and comprised of a rotor mounted on a turbine shaft to drive a load; a thermal insulation panel coupled to the casing to reduce heat dispersion through the casing, the insulation panel comprising a metal sheet having an outer surface and an inner surface and an insulating sheet comprising a quilted panel encased in woven glass cloth coupled to the outer surface of the metal sheet and an air manifold located at one end of the thermal insulating panel and with access to an air inlet that permits cooling air into the channels, wherein the inner surface of the metal sheet contacts the ribs of the casing to enclose the channels and form passages bounded by the inner surface of the metal sheet and the outer surface of the casing; and wherein the adjacent channels are configured to allow cooling air to circulate therethrough when the rotor is working and allow air in the passages to act as a thermal insulator for the rotor when the rotor is idle, and wherein each of the passages are completely bordered so that none of the laterally spaced adjacent passages extend into each other.

2. The aeroderivative gas turbine according to claim 1, wherein each of the passages extends from the casing toward the thermal insulation panel.

3. The aeroderivative gas turbine according to claim 1, wherein the insulation panel is located on the part of the casing containing, at least partially, the power turbine.

4. The aeroderivative gas turbine according to claim 1, wherein the insulation assembly is arranged on the casing longitudinally, circumferentially, spirally or following any suitable pattern to provide an optimized thermal management.

5. The aeroderivative gas turbine according to claim 1, wherein the quilted panel is stitched through parallel or crosswise in distances from 25 to 100 mm.

6. The aeroderivative gas turbine according to claim 1, wherein the cooling air is impinged in the passages through the air inlet by means of the air manifold.

7. The aeroderivative gas turbine according to claim 1, further comprising a forced-air generator, generating a stream of forced cooling air at a pressure sufficient to circulate the cooling air in the plurality of laterally spaced adjacent passages to control heat dissipation.

8. The aeroderivative gas turbine according to claim 1, further comprising an outlet in fluid communication with the turbine main outlet to allow the air to leave the passages.

9. The aeroderivative gas turbine according to claim 1, further comprising one or more sensors to measure the speed of the rotor and/or the temperature in one or more areas of the aeroderivative turbine and a control unit configured to: read the output of the sensor or the sensors; compare the output with thresholds to determine a condition of over-temperature or compare the output with a temperature target depending on the aeroderivative turbine running state; act on the forced-air generator to regulate air flow in the passages to control heat exchange through the casing.

* * * * *